Aug. 1, 1939.  G. H. SCHIEFERSTEIN  2,167,911
SUSPENSION SYSTEM FOR VEHICLES
Filed April 23, 1936
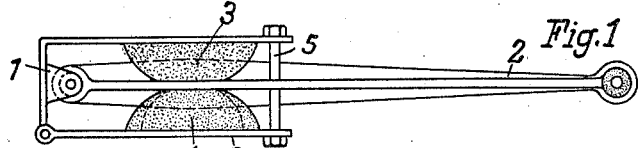
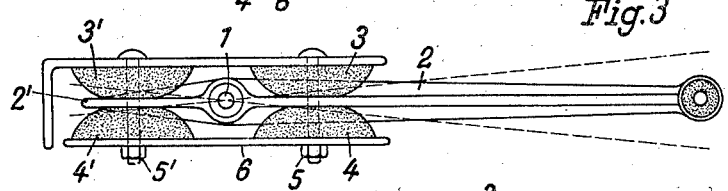
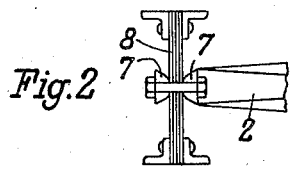
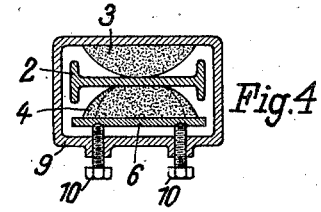
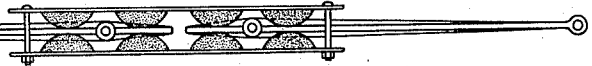
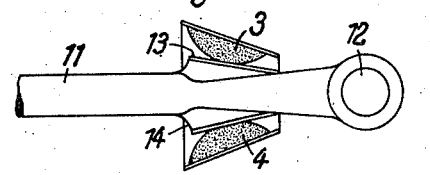
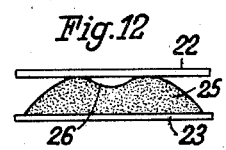
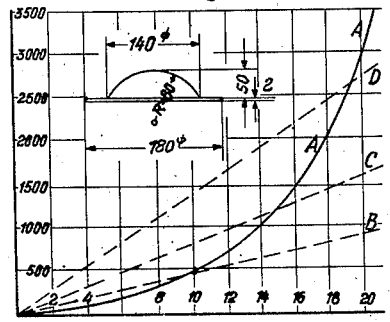
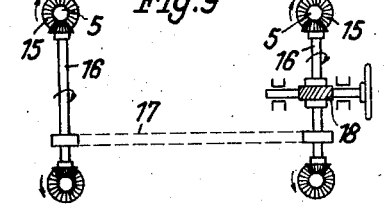
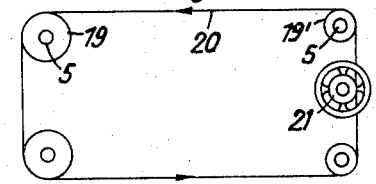
Inventor:
Georg Heinrich Schieferstein
By Otto Munk
his Att'y.

Patented Aug. 1, 1939

2,167,911

UNITED STATES PATENT OFFICE 2,167,911

SUSPENSION SYSTEM FOR VEHICLES

Georg Heinrich Schieferstein, Berlin-Charlottenburg, Germany

Application April 23, 1936, Serial No. 75,976
In Germany April 25, 1935

5 Claims. (Cl. 267—21)

This invention relates to an improved suspension system for vehicles.

It is usual to employ steel springs for suspending the road wheels of vehicles, though hollow rubber balls, or ordinary rubber rings are occasionally used for vehicular suspension.

In accordance wtih the present invention, a suspension system is provided in which a transmission lever is loaded by a solid rubber member (or member of equivalent material) which—in one longitudinal section at least—tapers towards the surface by which it is pressed, in such a manner that, on being pressed, its contact surface quickly changes from a punctiform shape (in extreme cases) to a broad area—or, when under initial tension, from a small surface to a large one—thereby producing a pseudo-harmonic suspension, that is to say, a suspension in which the load-supporting capacity increases far out of proportion with the increase in compression applied. By means of the present invention it is possible to obtain with a suspension member of very low weight, not only a long stroke and powerful cushioning action of the transmission lever, but also the effect that as the compression progressively increases, an originally soft suspension attains such a final degree of stiffness that both the lightest and the heaviest loads and shocks are satisfactorily cushioned.

Though in principle a unilateral loading only of the transmission lever through a rubber member is needed against the action of the load of the vehicle, two rubber members, acting in opposition, may with advantage, be located on opposite sides of the said lever. This arrangement enables the recoil of the car wheels to be cushioned in the same complete manner as in the case of the absorption of the primary main impact.

A completely symmetrical design of the rubber member imparts a specially increased loading capacity. When the member is in the form of a spherical segment, for example, an extremely effective loading-capacity curve is obtained. At the same time, vulcanizing the zone of maximum section of the rubber member on to a metal plate improves the utilisation capacity of the rubber, since in the case the constituent portions of said zone of maximum section are also very extensively utilised for the cushioning effect. Vulcanizing the other surface also on to a metal plate protects the free contact surface against friction, a projection being preferably provided on said plate, and extending into the rubber member in order to make the connection more secure.

According to the invention moreover, the transmission lever may be designed as a two-armed lever, whereby the pivot of the lever is relieved from stresses. A combination of two levers may also be used to form a large elastic member of the semi-elliptical spring type, and finally, means may be provided for separately or jointly adjusting the suspension members of the vehicle and enabling the frequency of the oscillations, and the amplitude thereof, to be adjusted to values which are most suitable for different conditions of load.

The suspension system of the present invention may also utilise one of the stub axles (swinging half axles), carrying the road wheels, as the transmisison lever, an arrangement resulting in a very simple construction of the whole. Moreover transmission levers may be employed which engage with a wheel axle and have their hinges mounted so as to yield against tilting, by means of rubber members with initial tension, to enable all oscillations of the axle to be easily followed.

The invention, is illustrated diagrammatically and by way of example in the drawing in which:

Fig. 1 is an elevation of a single-arm suspension; and

Fig. 2 is a modified hinge for the same;

Fig. 3 is a single-arm suspension relieved from stress by being gripped on both sides of the hinge;

Fig. 4 is a cross section through an adjusting device;

Fig. 5 is a diagram of the strokes and stresses of a suspension member;

Fig. 6 is an elevation of a two-arm suspension, with halves of the kind shown in Fig. 1;

Fig. 7 is a similar suspension, with halves of the kind shown in Fig. 3;

Fig. 8 is an elevation of a modified suspension, especially in the form of a stub or swinging axle;

Figs. 9 and 10 are elevations of two arrangements for adjusting all the springs of a vehicle; whilst Figs. 11 and 12 are elevations of two cushioning members.

In the embodiment shown in Fig. 1, a transmission lever 2, mounted in a bearing I secured to the vehicles, carries one of the car wheels on its free end. The transmission lever is subjected to the load of the car through a spherical segment 3 of rubber. A second rubber member 4—of smaller dimensions, if desired—is pressed against the lower side of the lever, by means of a pressure plate 6 (adjutsable by means of screws 5), in such a manner that on the occurrence of impact, the lever 2, together with the attached wheel, oscillates with the desired—and as far as possible harmless—frequency, and bears the load to be taken up from the vehicle, without any unduly small, or unduly large amplitude. The position of the rubber members 3, 4, near the pivotal point 1 of the lever enables sufficiently ample deflections of the lever to be exerted by comparatively slight movements of the rubber members, which are subjected to compression only.

In Fig. 2, hinge 1 of Fig. 1—which is relatively heavily loaded and therefore under considerable friction—is replaced by an elastic connection, the lever 2 gripping a laminated spring 8, by means of two cheeks 7, clamped together by bolts, the said spring flexing in accordance with the oscillation of the lever.

In the embodiment shown in Fig. 3, the pivotal point 1 of the lever 2 is relieved from stress by the provision of a counter arm 2', engaged by auxiliary rubber members 3', 4'. In this case also, the rubber members are subjected to pressure by a plate 6, adjustable by means of bolts 5, 5'.

In the embodiment shown in Fig. 4, the lever and rubber members are enclosed in a housing 9, in the interior of which the adjustment plate 6 can be pressed forwards by means of screws 10.

All the suspension systems described herein produce the pseudo-harmonic effect represented by the full curve A in the diagram of Fig. 5, which gives the behaviour of the rubber member having dimensions as shown in the inset to said diagram. This indicates that, up to a compression of 10 mm., a load of 500 kg. is borne, whilst up to a compression of 20 mm., fully 3000 kg. of load are supported. By way of contrast, the broken lines B, C, D represent the behaviour of three ordinary harmonic springs, the functioning of which is restricted, in each case, to a very small range of load. It will also be seen from said lines that the harmonic springs are too unyielding for smaller forces and too yielding for higher forces.

Fig. 6 shows the combination of two suspensions of the type shown in Fig. 1 to form a two-armed spring which can be employed in exactly the same manner as a semi-elliptical spring. Three-quarter elliptical, or fully elliptical springs can be built up in a corresponding manner.

Fig. 7 shows the construction of a two-armed lever in a precisely similar manner, but from single springs of the type shown in Fig. 3.

In the embodiment shown in Fig. 8, a stub or swinging axle 11, carrying a road wheel of the car, is pivotally mounted in a bearing 12 attached to the car in a longitudinal direction, said axle being provided with presser plates 13, 14, faced by the rubber members 3, 4. In this case, the presser plates 13, 14 and the rubber members 3, 4 are disposed at such an angle as to prevent any sliding friction between the plates and the rubber members during the oscillation of the axle 11 forming the transmission lever.

In the embodiment shown in Fig. 9, cone pinions 15 are mounted on the adjusting screws 5 of all the suspension members of a car, and cone-pinion shafts 16 connect the two wheels on each axle, and are themselves interconnected by further gear mechanism 17, which may consist of an actuating cable. A worm drive 18, operated by a hand wheel, serves for the adjustment of the whole.

In Fig. 10, an exactly corresponding connection is obtained by means of a cable drive, the adjusting screws 5 for the front axle being provided with large pulleys 19, and the adjusting screws 5 for the rear axle with smaller pulleys 19', whilst a cable 20 is passed round all these pulleys and a winch drum 21 adapted to be rotated by a hand wheel. In consequence of the different dimensions of said pulleys, the adjustments applied to the front springs are smaller than those for the rear springs, because the former are less affected by the variable useful load carried by the vehicle.

In the embodiment shown in Fig. 11, a rubber spring member, having two broad base surfaces vulcanized on to metal plates 22, 23, is designed, in other respects, after the fashion of two spherical segments 24 integrally combined at their apices. This member functions in precisely the same manner as a member of equal height of the kind initially described, except that, in some circumstances, it is more easily mounted by reason of its two terminal metal plates.

In the embodiment shown in Fig. 12, a simple spherical rubber segment 25 is vulcanized on to two plates 22, 23, and the plate 22 mounted on the apex projects into the rubber by means of a nipple 26, thereby assuring a specially secure attachment.

In all cases of vehicular suspension, damping of the occurrent oscillations by friction is desirable. This is attainable, in a simple manner, by the use of rubber with high internal friction.

The changes of position undergone by the transmission lever 2, stub or swinging axle 11 and connecting mechanism 15—21, as the result of displacements of the road-wheel axles and warping of the chassis, are capable of being corrected, since all the essential gear members are flexibly held in position by initially tensioned rubber members.

I claim:

1. A suspension system for vehicles comprising two rigid plates, a solid rubber cushioning member having a smaller contact surface and a considerably larger contact surface, said member having such a form that at least one longitudinal section thereof corresponds to a circle segment, and a transmission lever pressing against said member, said member being vulcanized both on its larger and smaller contact surfaces to said rigid plates respectively.

2. A suspension system for vehicles comprising two rigid plates, a solid rubber cushioning member having a smaller contact surface and a considerably larger contact surface, said member having such a form that at least one longitudinal section thereof corresponds to a circle segment, and a transmission lever pressing against said member, the latter being vulcanized both on its larger and smaller contact surfaces to said rigid plates, the metal plate vulcanized to the smaller contact surface engaging the latter by means of a projection.

3. A suspension system for vehicles comprising at least two pairs of solid rubber cushioning members, each member having a smaller contact surface and a considerably larger contact surface, each member having such a form that at least one longitudinal section thereof corresponds to a circle segment, pairs of said members gripping the ends of two oppositely directed transmission levers to form a double-ended pseudo-harmonically suspended spring member.

4. A suspension system for vehicles comprising a plurality of pairs of solid rubber cushioning members, each member having a smaller contact surface and a considerably larger contact surface, the breadth of the member continually increasing between said contact surfaces along one longitudinal section at least, each pair of members gripping a transmission lever between them and being mutually adjustable, all the adjusting means being connected together for adjustment in the same direction by actuating means such as cable mechanism or shaft and pinion gear, but the adjusting movements for the suspensions which are less effected by fluctuations of the loading being shorter than those for the remaining suspensions.

5. A suspension system for vehicles comprising stub axles carrying the wheels of the vehicle, a plurality of rigid plates, a plurality of solid rubber cushioning members, each member having a smaller contact surface and a considerably larger contact surface, said members having such a form that at least one longitudinal section thereof corresponds to a circle segment of less height than half a circle, each member being vulcanized with its larger surface to one of said plates, pairs of said members gripping said stub axles, said axles acting as transmission levers whereby pseudo-harmonic suspension is produced.

GEORG HEINRICH SCHIEFERSTEIN.